US011263637B2

United States Patent
Suzuki (10) Patent No.: US 11,263,637 B2
(45) Date of Patent: Mar. 1, 2022

(54) REGISTRATION APPARATUS, A METHOD FOR REGISTERING COMMODITY INFORMATION, AND A NON-TRANSITORY COMPUTER READABLE MEDIUM

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 16/729,013

(22) Filed: Dec. 27, 2019

(65) Prior Publication Data
US 2020/0265431 A1   Aug. 20, 2020

(30) Foreign Application Priority Data
Feb. 19, 2019   (JP) .............................. JP2019-027853

(51) Int. Cl.
*G06Q 20/40* (2012.01)
*G06Q 20/20* (2012.01)
(Continued)

(52) U.S. Cl.
CPC ......... *G06Q 20/407* (2013.01); *G06Q 20/204* (2013.01); *G06Q 20/208* (2013.01);
(Continued)

(58) Field of Classification Search
CPC .. G06Q 20/407; G06Q 20/204; G06Q 20/208; G07G 1/009; G07G 1/01; G07G 1/0045; G07G 1/0009; G07G 1/12
See application file for complete search history.

(56) References Cited

U.S. PATENT DOCUMENTS

| | | | | |
|---|---|---|---|---|
| 5,510,979 A | * | 4/1996 | Moderi | G06Q 20/202 235/377 |
| 2004/0084516 A1 | * | 5/2004 | Ogawa | G07G 1/12 235/145 R |

(Continued)

FOREIGN PATENT DOCUMENTS

| | | |
|---|---|---|
| CN | 206757803 U | 12/2017 |
| JP | 2004-157744 A | 6/2004 |

OTHER PUBLICATIONS

"How Do I Void the Last Item that Was Added to a Transaction?". Retrieved from <https://fiscal.screenstepslive.com/s/help/m/POS/I/595208-how-do-i-void-the-last-item-that-was-added-to-a-transaction> on Jul. 12, 2021. Originally published 2013. (Year: 2013).*

(Continued)

*Primary Examiner* — Nathan A Mitchell
(74) *Attorney, Agent, or Firm* — Kim & Stewart LLP (57) ABSTRACT

A registration apparatus for registering commodity information includes a bar code reader configured to read commodity information from a symbol attached to a commodity, a wireless tag reader configured to read tag information stored in a wireless tag attached to a commodity, a first cancel key, and a processor configured to upon reading of tag information stored in a wireless tag via the wireless tag reader, acquire commodity information associated with the tag information and register the acquired commodity information as first data, upon reading of commodity information from a symbol via the bar code reader, register the read commodity information as second data, and upon detection of the first cancel key being operated, cancel registration of the commodity information registered as the first data.

19 Claims, 7 Drawing Sheets

(51) Int. Cl.
*G07G 1/00* (2006.01)
*G07G 1/01* (2006.01)
*G07G 1/12* (2006.01)

(52) U.S. Cl.
CPC ........... *G07G 1/009* (2013.01); *G07G 1/0009* (2013.01); *G07G 1/0045* (2013.01); *G07G 1/01* (2013.01); *G07G 1/12* (2013.01)

(56) References Cited

U.S. PATENT DOCUMENTS

| | | | | |
|---|---|---|---|---|
| 2005/0049914 | A1* | 3/2005 | Parish | G06Q 30/0225 705/14.26 |
| 2005/0247778 | A1* | 11/2005 | Roberts | G07G 1/0045 235/383 |
| 2006/0261161 | A1* | 11/2006 | Murofushi | G06Q 30/06 235/383 |
| 2011/0000963 | A1* | 1/2011 | Mercado | G06Q 20/201 235/383 |
| 2012/0321147 | A1* | 12/2012 | Kamiya | G07G 1/12 382/118 |
| 2015/0127490 | A1* | 5/2015 | Puertas | H04M 1/72457 705/26.62 |
| 2015/0186862 | A1* | 7/2015 | Itani | G06Q 20/20 705/23 |
| 2016/0086148 | A1* | 3/2016 | Katsumura | G06Q 20/208 705/23 |
| 2016/0179337 | A1* | 6/2016 | Ballesteros | G06F 3/0481 715/773 |
| 2017/0004476 | A1* | 1/2017 | Suzuki | G07G 1/12 |
| 2017/0158215 | A1* | 6/2017 | Phillips | B60B 19/00 |

OTHER PUBLICATIONS

"How Do I Void the First Item that Was Added to a Transaction?". Retrieved from <https://fiscal.screenstepslive.com/s/help/m/POS/l/595210-how-do-i-void-the-first-item-that-was-added-to-a-transaction> on Jul. 12, 2021. Originally published 2013. (Year: 2013).*

Office Action dated Sep. 10, 2021 in corresponding Chinese Patent Application No. 202010078443.8, 15 pages (with Translation).

* cited by examiner

REGISTRATION APPARATUS, A METHOD FOR REGISTERING COMMODITY INFORMATION, AND A NON-TRANSITORY COMPUTER READABLE MEDIUM

CROSS-REFERENCE TO RELATED APPLICATIONS

This application is based upon and claims the benefit of priority from Japanese Patent Application No. 2019-027853, filed on Feb. 19, 2019, the entire contents of which are incorporated herein by reference.

FIELD

Embodiments of the present invention relate to a registration apparatus, a method for registering commodity information, and a non-transitory computer readable medium.

BACKGROUND

Conventionally, there is a registration apparatus such as a POS (Point of Sales) terminal that reads a symbol such as a bar code attached to a commodity by a bar code reader. The registration apparatus acquires a commodity code for identifying the commodity to which the symbol is attached by optically reading the bar code, and executes sales registration processing of the commodity based on the acquired commodity code.

On the other hand, there is a POS terminal that executes sales registration processing after reading radio tag information transmitted by a radio tag that is attached to a commodity instead of optically reading a symbol. Recently, since both commodities having symbols and commodities having radio tags are displayed for sale in a store, the POS terminal is equipped with both a bar code reader and a radio tag reader.

An operator such as a store clerk separates commodities to be purchased by a customer (for example, commodities carried in a basket by a customer) into commodities having symbols and commodities having radio tags, and then operates the POS terminal to read the symbols by the bar code reader and the radio tags by an antenna of the radio tag reader such that the tag information transmitted by the radio tags is read at once.

The tag information transmitted by the radio tag includes an individual item code for identifying a single commodity. On the other hand, the POS terminal obtains and processes a commodity code that specifies a type of the commodity based on the tag information for sales registration processing. Since the individual item code cannot be specified from the commodity code when there are a plurality of commodities having the same commodity code in the store, and a customer wants to return such commodities, it is impossible to identify the individual item code of each commodity that will be returned. For this reason, to return a commodity with a radio tag to the shop, the POS operator needs to perform a batch cancellation operation to clear all the data registered in the POS terminal. This batch cancellation also clears all the data of the commodities which was registered by reading the bar codes. The data registered in the POS terminal by operating a one touch key from the operation unit is also cleared.

After all the registration of commodities has been cancelled, a new registration processing needs to be done for registering non-returned commodities including the commodities that was once read by the bar code reader, or the commodities whose data was once input from the operation unit.

DETAILED DESCRIPTION

A registration apparatus for registering commodity information according to one embodiment includes a bar code reader configured to read commodity information from a symbol attached to a commodity, a wireless tag reader configured to read tag information stored in a wireless tag attached to a commodity, a first cancel key, and a processor configured to upon reading of tag information stored in a wireless tag via the wireless tag reader, acquire commodity information associated with the tag information and register the acquired commodity information as first data, upon reading of commodity information from a symbol via the bar code reader, register the read commodity information as second data, and upon detection of the first cancel key being operated, cancel registration of the commodity information registered as the first data.

Hereinafter, a description of an embodiment of the present invention will be described. In the embodiment, a POS terminal 1 will be described as an example of a registration apparatus. A commodity that is sold in a store will be described as an example of an article. Further, the POS terminal 1 receives radio waves and reads tag information relating to the commodity stored in the radio tag attached to the commodity, for example, by using the technology of RFID. The radio tag includes a tag ID to identify the radio tag and a commodity code to specify a commodity. Furthermore, the POS terminal 1 transmits and writes information indicating that settlement processing has been performed to the radio tag by using the technology of the RFID. It should be noted that the present invention is not limited to the embodiments described below. The POS terminal 1 optically reads a symbol, such as a bar code and a two dimensional code, attached to a commodity. Further, the POS terminal 1 may read such a symbol attached to the commodity as an image.

Figure 1:
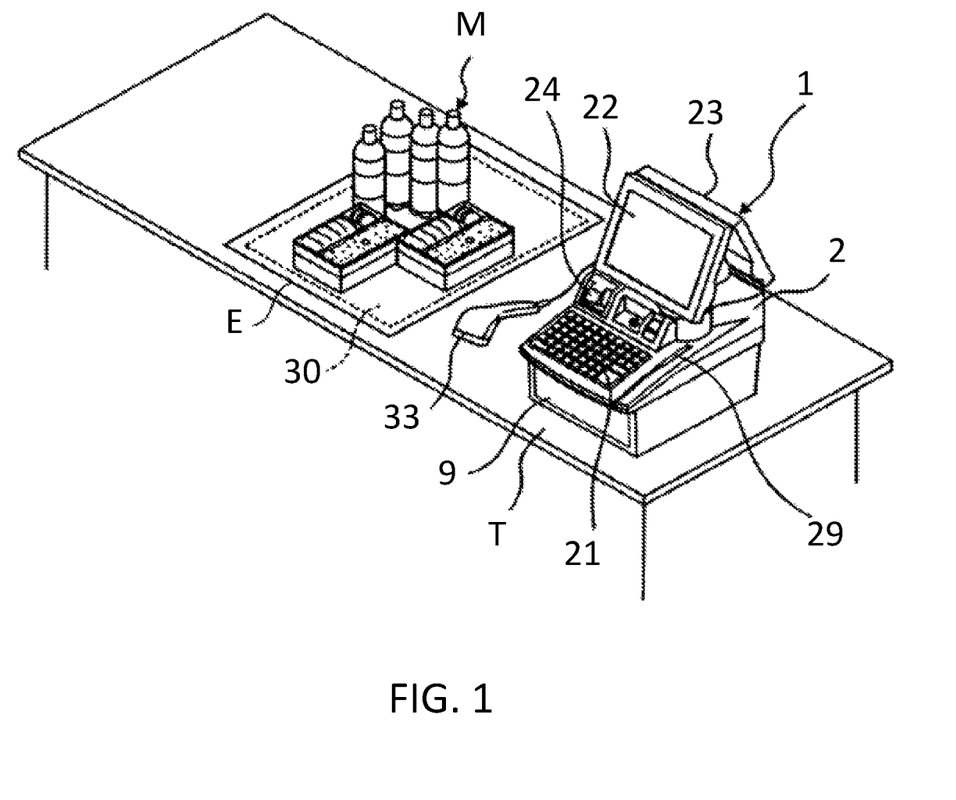
FIG. 1 is a perspective view of a POS terminal according to one embodiment.

FIG. 1 is a perspective view of the POS terminal 1 having a tag reader 30 and arranged on a checkout counter T. The POS terminal 1 is installed in a store such as a supermarket, and performs sales registration processing and settlement processing of a commodity M purchased by a customer. The tag reader 30 reads tag information stored in a radio tag attached to the commodity M in a non-contact manner by using radio waves.

The POS terminal 1 performs the following three processes as the sales registration processing progresses. That is, the POS terminal 1 acquires the commodity code related to the commodity M to be sold. Based on the acquired commodity code, the POS terminal 1 reads commodity information of the commodity M, such as a commodity name or a price, from a commodity master 142 shown in FIG. 2, and displays the commodity information on a display. The POS terminal 1 stores the commodity information in a registered commodity information table 131 shown in FIG. 2. The POS terminal 1 performs the following four processing as a settlement processing. That is, the POS terminal 1 displays the total amount of the transaction based on the commodity information stored in the registered commodity information table 131 in association with the sales registration processing. The POS terminal 1 calculates and displays a change based on a deposit payed from the customer. The POS terminal 1 instructs the change machine to issue the change. The POS terminal 1 issues a receipt on which commodity information and settlement information including total amount, deposit amount, change amount, and the like are printed.

As shown in FIG. 1, the POS terminal 1 includes a main body 2, a display unit for store clerks 22, a display unit for customers 23, an operation unit 21, a bar code reader 33, a card reader 29, a printer 24, and a drawer 9. The POS terminal 1 is electrically connected to the tag reader 30. Further, the main body 2 includes a control unit 100 (see FIG. 2) and a power supply unit (not shown).

The display unit for store clerks 22 is provided on the top portion of the main body 2 toward the clerk side of the checkout counter T. The display unit for store clerks 22 displays the name and price of the commodity M based on commodity information read by the bar code reader 33 and acquired from the commodity master 142 (refer to FIG. 2) based on the symbol.

The display unit for customers 23 is attached to the customer side of the checkout counter T in a face-to-face relation to the display unit for store clerks 22. The display unit for customers 23 displays the name and price of the commodity M on the customer based on the commodity information acquired based on the symbol read by the bar code reader 33.

The operation unit 21 is a keyboard including a key such as an end key to complete sales registration processing of the commodity M purchased by the customer. When the display unit for store clerks 22 has a function of a touch panel recognizing an instruction by a clerk, the operation unit 21 includes the touch panel.

The bar code reader 33 is a device for optically or imaging and reading symbols such as bar codes and two dimensional codes attached to each commodity M, and is arranged on the central portion of the checkout counter T. Each commodity M has one of or both of a radio tag and a symbol. The POS terminal 1 acquires a commodity code for specifying the type of the commodity based on the read symbol or tag information.

The card reader 29 magnetically or electrically reads information from the customer's point card and credit card inserted into the card insertion port.

The printer 24 prints commodity information and settlement information relating to the commodity M subjected to the settlement processing on the receipt sheet. The printer 24 issues the receipt on which the commodity information and the settlement information are printed.

The drawer 9 can be opened and closed to store cash, securities or the like therein. The store clerk stores cash (e.g., coins or bills) and securities received from the customer and in the drawer 9. The store clerk takes out the change from the drawer 9 and give it to the customer together with the receipt.

Next, the configuration of the tag reader 30 will be described. The tag reader 30 is installed so as to be somewhat buried in the checkout counter T. The tag reader 30 is installed in the vicinity of a predetermined area E, which is a position where the commodity M on the checkout counter T is placed.

The tag reader 30 reads tag information stored in a tag attached to the commodity M, in particular, a radio tag operating in the UHF band. The tag reader 30 is provided with an antenna 27 (see FIG. 2). The antenna 27 is embedded in the checkout counter T. The antenna 27 has, for example, a plane patch antenna on a surface directed to the checkout counter T.

Figure 2:
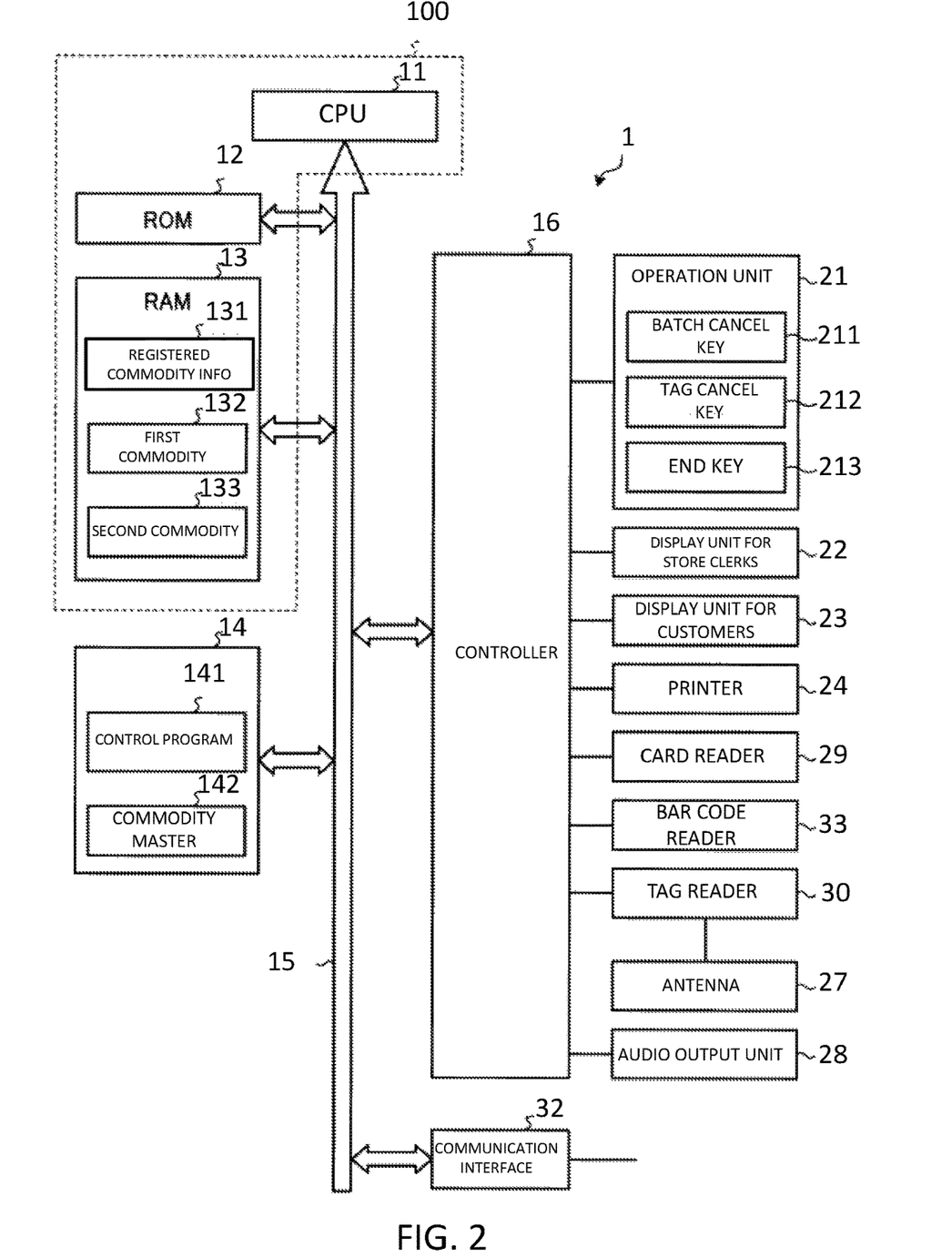
FIG. 2 is a block diagram showing a hardware configuration of the POS terminal.

The tag reader 30 transmits radio waves from the antenna 27. The antenna 27 receives tag information transmitted from a radio tag attached to the commodity M placed in the predetermined area E. The tag reader 30 reads the tag information received by the antenna 27. The POS terminal 1 acquires a commodity code for specifying the type of the commodity based on the read tag information.

Next, the hardware of the POS terminal 1 will be described. FIG. 2 is a block diagram showing a hardware configuration of the POS terminal 1. As shown in FIG. 2, the POS terminal 1 includes a CPU (Central Processing Unit) 11, a ROM (Read Only Memory) 12, a RAM (Random Access Memory) 13, a storage unit 14, and the like. The CPU 11 is a control main body. The RAM 13 temporarily stores programs and various kinds of data. The storage unit 14 stores various programs. The CPU 11, the ROM 12, the RAM 13, and the storage unit 14 are connected to each other via a bus 15. The CPU 11, the ROM 12, and the RAM 13 make up a control unit or a controller 100. That is, the control unit 100 executes the control processing of the POS terminal 1, which will be described later, by executing control programs stored in the ROM 12 and the storage unit 14 and loaded into the RAM 13.

The RAM 13 stores the registered commodity information table 131, a first commodity information table 132, and a second commodity information table 133. The registered commodity information table 131 will be described later with reference to FIG. 5. The first commodity information table 132 will be described later with reference to FIG. 3. The second commodity information table 133 will be described later with reference to FIG. 4.

The storage unit 14 is a hard disk drive (HDD), a flash memory, or the like, and maintains stored data even when the power supply is shut off. The storage unit 14 stores a control program 141 and a commodity master 142. The control program 141 is a program performed by the CPU 11 for controlling the POS terminal 1. The commodity master 142 stores commodity information, such as a commodity name and a unit price of the commodity, in association with a commodity code specifying the commodity.

The control unit 100 connects the operation unit 21, the display unit for store clerks 22, the display unit for customers 23, the printer 24, the card reader 29, the bar code reader 33, the tag reader 30, and the audio output unit 28 via the bus 15 and the controller 16. The operation unit 21 is a keyboard including a batch cancel key 211, a tag cancel key 212, and an end key 213. The batch cancel key 211 erases all commodity codes and commodity information of commodities that have been acquired by the POS terminal 1 in a transaction (i.e., information stored in the first commodity information table 132, information stored in the second commodity information table 133, and information stored in the registered commodity information table 131), and operates to cancel the sales registration processing for the commodities. The tag cancel key 212 is operated for deleting information of commodities stored in the first commodity information table 132 among all commodities registered in a transaction. Further, the tag cancel key 212 is operated for deleting from the registered commodity information table 131 the information of commodities that have been stored in the first commodity information table 132. The end key 213 is operated by the customer when the sales registration process is completed for all commodities to be purchased and the sales registration operation by the customer through the POS terminal 1 is finished.

The bar code reader 33 optically reads a symbol attached to a commodity. Further, the bar code reader 33 reads the symbol attached to the commodity by capturing the symbol as an image. The tag reader 30 is connected to the antenna 27. The tag reader 30 reads the tag information transmitted from the radio tag and received by the antenna 27. The audio output unit 28 is a device for notifying a clerk or a customer of information by sound or voice.

Further, the control unit 100 is connected to the communication interface (I/F) 32 via the bus 15. The communication interface 32 is connected to a store server (not shown), which is a host device of the POS terminal 1, so as to transmit and receive information.

Figure 3:
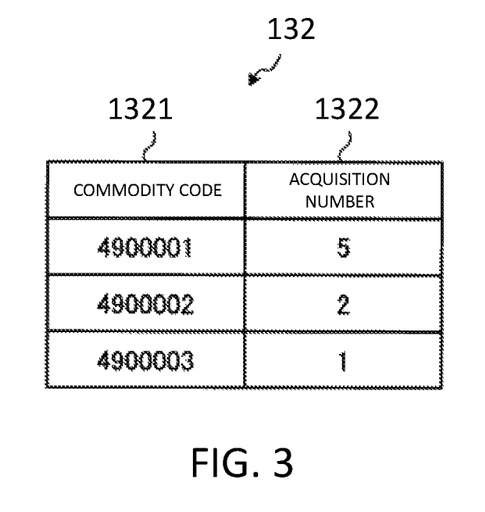
FIG. 3 shows a data structure for storing the number of commodity codes acquired based on tag information.

Next, a description will be given of the first commodity information table 132. The first commodity information table 132 stores a commodity code that identifies a commodity acquired based on tag information received by the antenna 27, and a number of acquisitions that the commodity code has been acquired. FIG. 3 is a diagram illustrating a data structure of the first commodity information table 132. As shown in FIG. 3, the commodity information table 132 includes a commodity code 1321 and an acquisition number 1322. The first commodity information table 132 stores the acquisition number "1" as the acquisition number 1322 for the commodity code acquired for the first time. In addition, when the acquired commodity code is already stored in the first commodity information table 132, the acquisition number 1322 is incremented for the commodity code.

In the example shown in FIG. 3, the number of acquisitions is "5" for the commodity code "4900001". This indicates that the commodity code "4900001" has been acquired five times based on the tag information read. Further, for the commodity code "4900002", the acquired number is "2", and it indicates that the commodity code "4900002" is acquired twice based on the read tag information. Further, for the commodity code "4900003", the acquired number is "1", and it indicates that the commodity code "4900003" is acquired once based on the read tag information.

Figure 4:
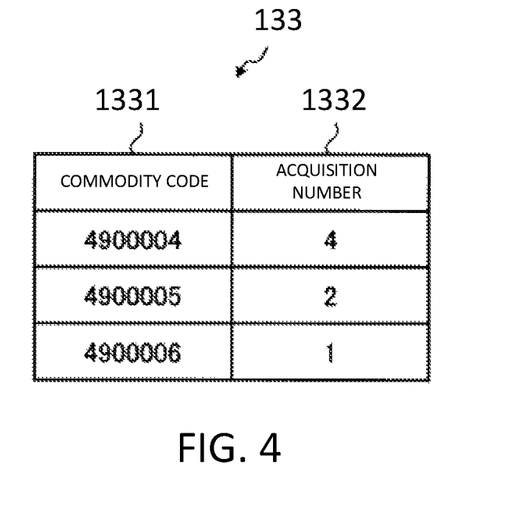
FIG. 4 shows a data structure for storing the number of commodity codes acquired via a bar code reader.

Next, a description will be given of the second commodity information table 133. The second commodity information table 133 stores a commodity code acquired by reading a symbol attached to a commodity and the number of acquired commodity codes. FIG. 4 shows a data structure of the second commodity information table 133. As shown in FIG. 4, the second commodity information table 133 stores a commodity code 1331 and an acquisition number 1332. The second storage unit 133 stores the acquisition number "1" for the product code acquired for the first time. In addition, when the acquired commodity code is already stored, the number stored in the acquisition number storing unit 1332 is incremented for the commodity code.

In the example shown in FIG. 4, the number of acquisitions is "4" for the commodity code "4900004" stored in the second commodity information table 133. This indicates that the commodity code "4900004" has been acquired four times based on the read symbol. Further, the number of acquisitions is "2" for the commodity code "4900005". This indicates that the commodity code "4900005" has been acquired twice based on the read symbol. Further, the number of acquisitions is "1" for the commodity code "4900006". This indicates that the commodity code "4900006" has been acquired once based on the read symbol.

Figure 5:
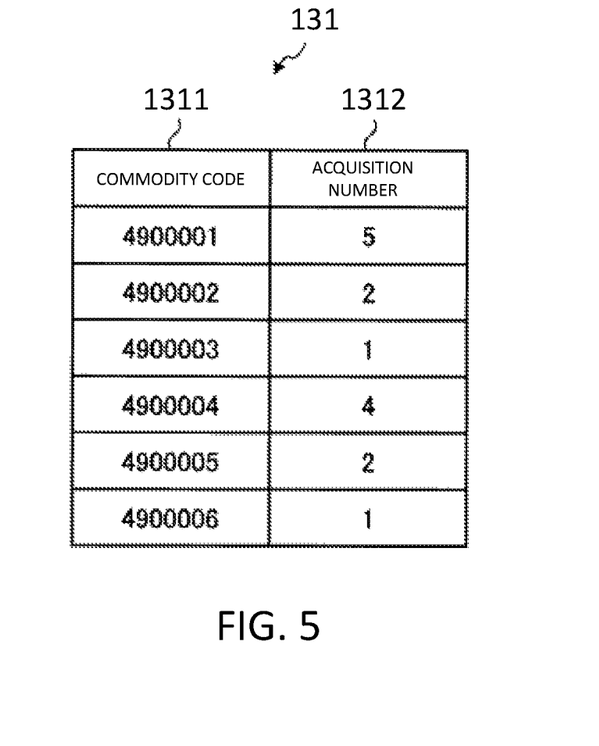
FIG. 5 shows a data structure for storing the number of commodity codes registered by the POS terminal.

Next, a description will be given of the registered commodity information table 131. The registered commodity information table 131 stores commodity information of the commodity (e.g., a commodity name, a commodity price, etc.) subjected to the sales registration processing by the POS terminal 1. The commodity information is stored in the registered commodity information table 131 simultaneously when the information is stored in the first commodity information table 132 or the second commodity information table 133. For example, when the commodity code 4900001 is first stored in the first commodity information table 132, similar information is also stored in the registered commodity information table 131. Further, when the acquisition number "5" is stored in the first commodity information table 132 for the commodity code "4900001, the acquisition number" 5 "is also stored in the registered commodity information table 131.

For example, when the commodity code 4900004 is first stored in the second commodity information table 133, similar information is also stored in the registered commodity information table 131. Further, when the acquisition number "4" is stored in the second commodity information table 133 for the commodity code "4900004, the acquisition number "4" is also stored in the registered commodity information table 131.

Figure 6:
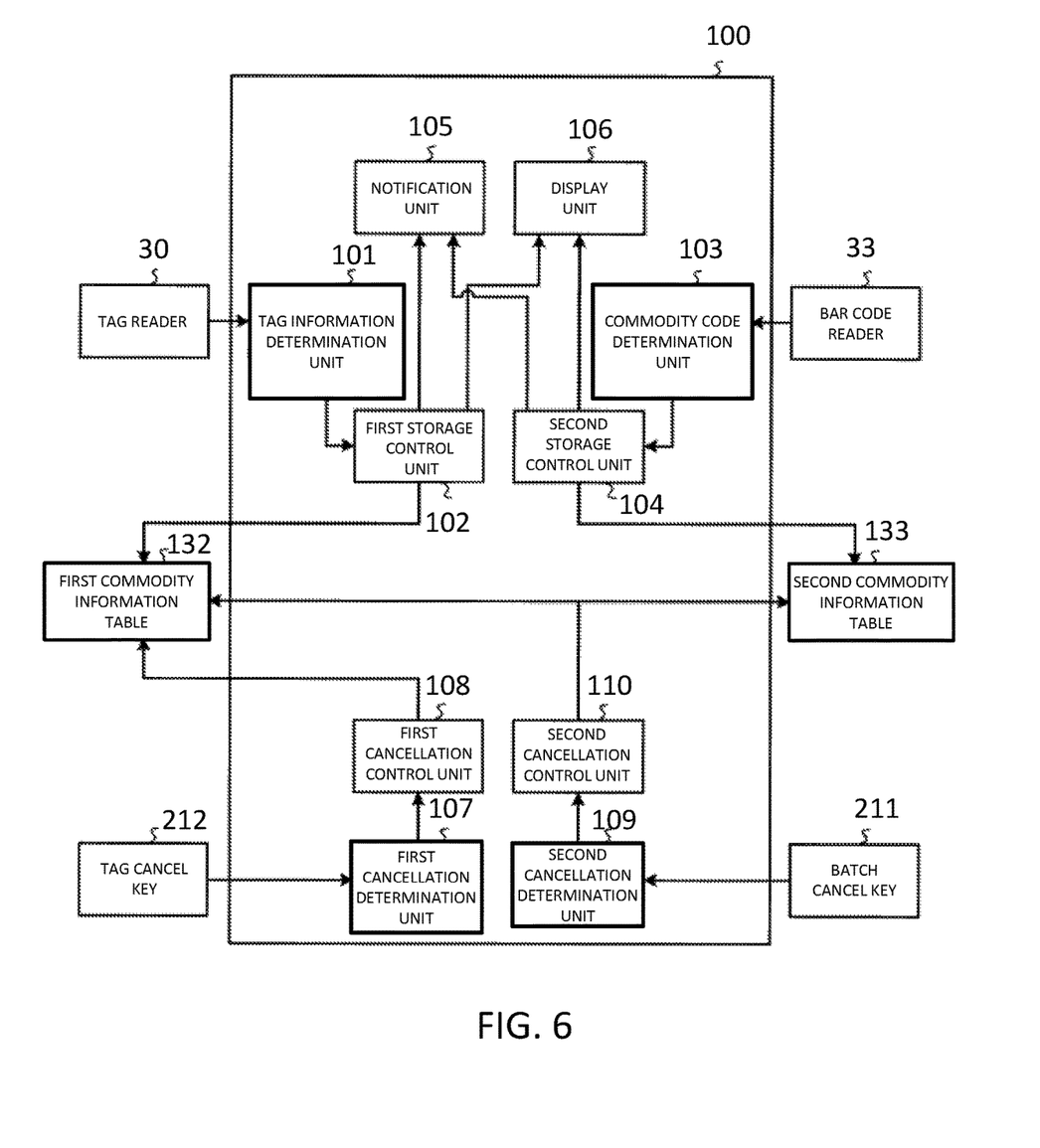
FIG. 6 is a block diagram showing a functional configuration of the POS terminal.

The functional configuration of the POS terminal 1 will now be described. FIG. 6 is a block diagram showing a functional configuration of the POS terminal 1. As shown in FIG. 6, the control unit 100 of the POS terminal 1 functions as a tag information determination unit 101, a first storage control unit 102, a commodity code determination unit 103, a second storage control unit 104, a notification unit 105, a display unit 106, a first cancellation determination unit 107, a first cancellation control unit 108, a second cancellation determination unit 109, and a second cancellation control unit 110, by performing the control program stored in the RAM 13.

The tag information determination unit 101 determines whether the tag reader 30 receives the tag information stored in the radio tag, and determines whether the tag reader 27 has read the tag information from the radio tag information stored in the radio tag 27.

The first storage control unit 102 stores the commodity code acquired based on the tag information stored in the radio tag attached to the article received by the antenna 27 in the first commodity information table 132. Specifically, the tag reader 30 reads tag information received by the antenna 27, and the first storage control unit 102 stores the commodity code acquired based on the tag information read by the tag reader 30 in the first commodity information table 132.

The first storage control unit 102 acquires the commodity code indicating the type of the commodity based on the commodity code included in the tag information read by the tag information determination unit 101, and stores the number of the acquired commodity codes for each commodity code of the same type. Specifically, each time the commodity code is acquired, the number of the commodity code stored in the first commodity information table 132 is incremented. The commodity code is a code for specifying the type of the commodity (for example, XX milk). The individual item code is a code for individually specifying the commodity. Even if two commodities have the same commodity code, the individual item code of the each commodity is different.

The commodity code determination unit 103 determines whether or not the commodity code for specifying the type of the commodity is acquired based on the symbol attached to the commodity. Specifically, the symbol attached to the commodity is read by using the bar code reader 33. The commodity code determination unit 103 determines whether or not the commodity code of the commodity has been acquired based on the symbol read by the bar code reader 33.

The second storage control unit 104 stores the product code acquired based on the radio tag in the second commodity information table 133. Specifically, the second storage control unit 104 stores the product code acquired based on the symbol read by the bar code reader 33 in the second commodity information table 133. Each time the commodity code is acquired, the second storage control unit 104 increments the number of the commodity codes stored in the second commodity information table 133.

When the first storage control unit 102 stores the commodity code in the first commodity information table 132 or in the second commodity information table 133, the notification unit 105 outputs a voice sound from the audio output unit 28.

The display unit 106 controls the display unit 22 or 23 to display information indicating the medium in which the commodity code relating to the commodity stored in the first storage unit or the second storage unit is acquired. For example, when the first storage control unit 102 stores the commodity code in the first commodity information table 132 and when the second storage control unit 104 stores the commodity code in the second commodity information table 133, information indicating that the commodity code has been acquired is displayed. When the first storage control unit 102 stores the commodity code in the first commodity information table 132, the display unit 106 displays information indicating a radio tag as the medium. In addition, when the second storage control unit 104 stores the commodity code in the second commodity information table 133, the display unit 106 displays information indicating a bar code (or a symbol) as the medium.

The first cancellation determination unit 107 determines whether or not the tag cancel key 212 is operated.

When the tag cancel key 212 is operated, the first cancellation control unit 108 executes the cancel process for the commodity of the type specified by the commodity code. Specifically, when the first cancellation determination unit 107 determines that the tag cancel key 212 is operated, the first cancellation control unit 108 executes the cancellation process for the commodity of the type specified by the commodity code which is in the first commodity information table 132. The cancellation process is a process of clearing all of the commodity codes and the number of acquisitions stored in the first commodity information table 132. Further, the first cancellation control unit 108 clears all commodity information of the commodity subjected to the sales registration process based on the commodity code stored in the first commodity information table 132, from the registered commodity information table 131.

The second cancellation determination unit 109 determines whether the batch cancel key 211 has been operated.

When the batch cancel key 211 is operated, the second cancel control unit executes a cancel process for the specified commodity code. Specifically, when the second cancellation determination unit 109 determines that the batch cancel key 211 is operated, the second cancellation control unit 110 executes cancellation processing for the commodity code stored in the first commodity information table 132 and the commodity code stored in the second commodity information table 133. The cancellation processing is processing for clearing all of the commodity codes and the number of acquisitions stored in the first commodity information table 132 and the second commodity information table 133. In addition, the second cancellation control unit 110 clears all pieces of commodity information stored in the registered commodity information table 131.

Figure 7:
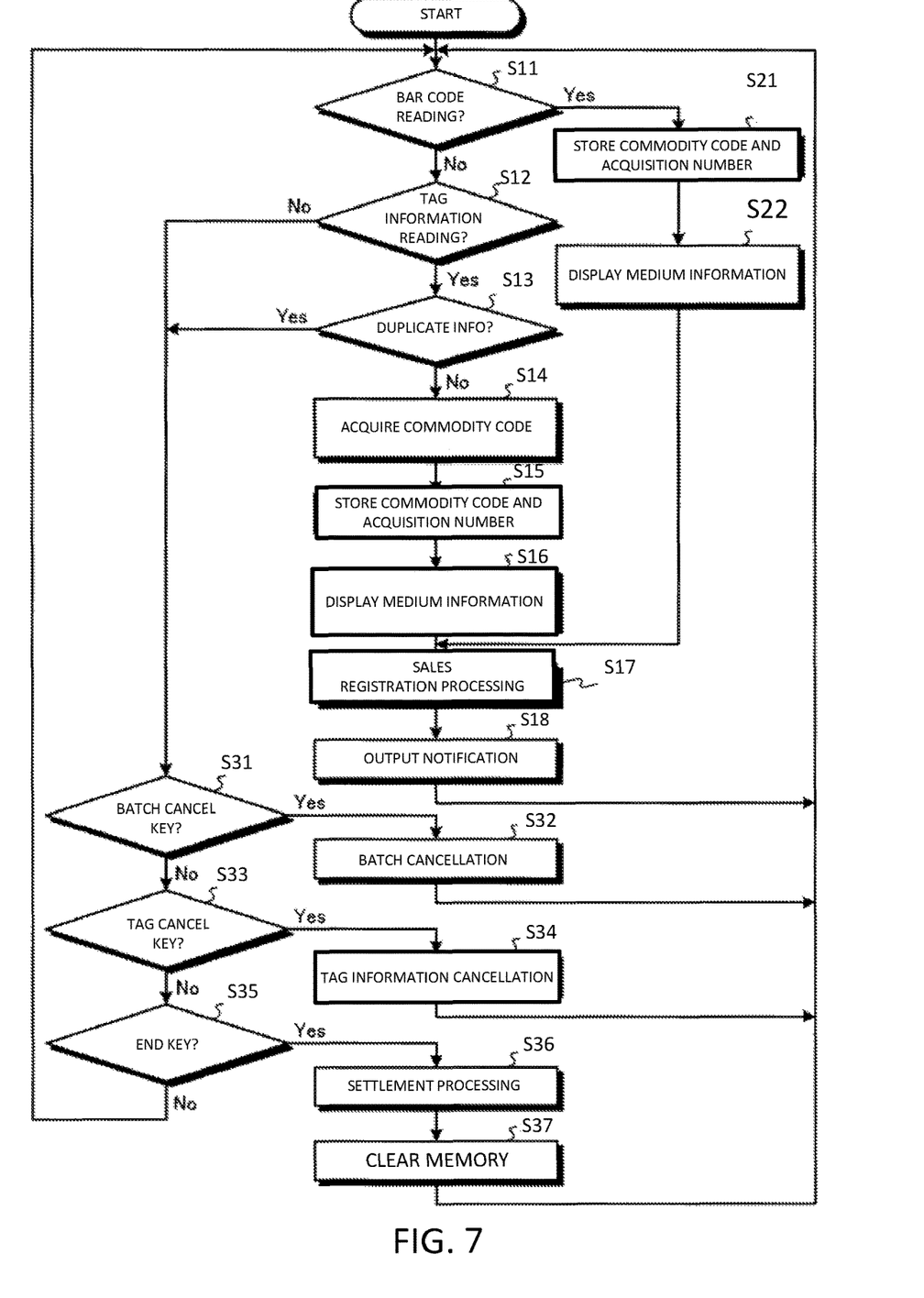
FIG. 7 is a flow chart showing a process performed by the POS terminal.

The control of the POS terminal 1 will now be described. FIG. 7 is a flowchart showing a process performed by the POS terminal 1. As shown in FIG. 7, the commodity code determination unit 103 of the POS terminal 1 determines whether or not the commodity code for specifying the type of the commodity is acquired based on the symbol read by the bar code reader 33 (S11).

When it is determined that the commodity code based on the symbol is not acquired (No in S11), the tag information determination unit 101 acquires the tag information stored in the radio tag attached to the commodity by the antenna 27, and determines whether the tag reader 30 has read the tag information (S12). In this case, the tag reader 30 collectively reads tag information from the radio tag attached to the commodity placed in the predetermined area E. The tag information determination unit 101 determines whether or not the tag information is read out. When it is determined that the tag reader 30 has read the tag information (Yes in S12), the control unit 100 determines whether the tag information determined to have been read in S12 is duplicate information that has already been read (S13). When it is determined that the information is not the duplicate information (No in S13), the control unit 100 acquires the commodity code indicating the type of the commodity based on the commodity code included in the tag information determined to be read by the tag information determination unit 101 (S14).

Next, the first storage control unit 102 stores information in the first commodity information table 132 for the acquired commodity code as described below (S15). In other words, when the acquired commodity code is already stored, the first storage control unit 102 increments the number of acquisitions stored in the first commodity information table 132 associated with the commodity code. In addition, when the acquired commodity code is not yet stored, the first storage control unit 102 newly stores the commodity code in the first commodity information table 132, and stores the acquired number "1" corresponding to the commodity code.

Next, based on the acquired commodity code, the display unit 106 controls the display unit for store clerks 22 to display information indicating the medium from which the commodity code has been acquired (for example, "radio tag") (S16). Next, based on the obtained commodity code, the control unit 100 executes the sales registration process relating to the commodity (S17). Next, the notification unit 105 outputs the notification sound indicating that the sales registration process has been executed based on the acquired product code (S18). Then, the control unit 100 returns to S11.

On the other hand, in S11, when it is determined that the commodity code based on the symbol is acquired by the commodity code determination unit 103 (Yes in S11), the second storage control unit 104 reads the symbol attached to the commodity and stores the acquired number of commodity codes (S21). Specifically, the second storage control unit 104 stores the number of acquisitions of the same type of commodity code based on the commodity code acquired by the commodity code determination unit 103. More specifically, when the acquired commodity code is already stored in the second commodity information table 133, the second storage control unit 104 increments the number of acquisitions stored in the second commodity information table 133 associated with the commodity code. When the acquired commodity code is not yet stored in the second commodity information table 133, the commodity code is newly stored in the second commodity information table 133, and the acquisition number "1" is stored corresponding to the commodity code.

Next, the control unit 100 controls the display unit for store clerks 22 to display information indicating the medium from which the commodity code has been acquired (e.g., bar code) (S22). Next, the control unit 100 executes the processes of S17 and S18, as described above. Then, the control unit 100 returns to S11.

In addition, in the case where the tag reader 30 determines that the tag reader 2 has not read the tag information in the process of S12 (No in S12), or in the case where it is determined in S13 that the tag information is duplicate information (Yes in S13), the first cancellation determination unit 109 determines whether the batch cancel key 211 has been operated. When it is determined that the batch cancel key 211 is operated (Yes in S31), the second cancellation control unit 110 executes the batch cancellation process for clearing all pieces of information (i.e., the commodity code and acquisition number) stored in the first commodity information table 132 and the second commodity information table 133 (S32). Further, the second cancellation control unit 110 clears all pieces of commodity information stored in the registered commodity information table 131. Then, the control unit 100 returns to S11.

When the second cancellation determination unit 109 determines that the batch cancel key 211 is not operated (No in S31), the first cancellation determination unit 107 determines whether or not the tag cancel key 212 is operated (S33). When it is determined that the tag cancel key 212 is operated (Yes in S33), the first cancellation control unit 108 executes the tag cancel process for clearing all pieces of information (i.e., the commodity code and acquisition number) stored in the first commodity information table 132 (S34). Further, the second cancellation control unit 110 clears all of the commodity information corresponding to the commodity code stored in the first commodity information table 132 from the registered commodity information table 131. Then, the control unit 100 returns to S11.

When the first cancellation determination unit 107 determines that the tag cancel key 212 is not operated (No in S33), the control unit 100 determines whether or not the end key 213 is operated (S35). When it is determined that the end key 213 is operated (Yes in S35), the control unit 100 executes settlement processing relating to the commodity based on the commodity information stored in the registered commodity information table 131 (S36). Then, the control unit 100 clears all pieces of information (i.e., the commodity code and acquisition number) stored in the first commodity information table 132 and the second commodity information table 133 (S37). Then, the control unit 100 returns to S11.

When it is determined that the operation is not the operation of the end key 213 (No in S35), the control unit 100 returns to S11.

According to such an embodiment, when the commodity of the commodity code acquired based on the tag information read from the radio tag is cancelled by the return or the like, only the information stored in the first commodity information table 132 is cleared by operating the tag cancel key 212, and the information of the commodity code acquired from the read symbol stored in the second commodity information table 133 is not cleared. Therefore, when a cancel operation is performed for a commodity to which a radio tag is attached, it is not necessary to perform a reading operation from the beginning for all the articles.

Further, according to the embodiment, in order to read tag information from radio tags attached to a plurality of commodities that have been subjected to the cancellation operation, it is enough for the store clerk to simply place the commodities in the predetermined area E.

For example, in the embodiment, the symbol attached to the commodity is read in order to acquire the commodity code. However, the present invention is not limited thereto, and the commodity information of the commodity may be allocated to a one touch key provided to the operation unit 21, and the commodity code may be acquired by operating the one touch key. In this case, the acquired commodity code is stored in the second commodity information table 133.

In addition, in the embodiment, a commodity displayed and sold at a store is described as an example of an article. However, the present invention is not limited thereto, and for example, an item to be inspected at the time of boxing may be used.

Further, in the embodiment, the tag reader 30 reads tag information collectively from radio tags attached to commodities placed in the predetermined area E. However, the present invention is not limited thereto, and for example, each commodity may be picked up one by one, and a radio tag attached to the commodity may be read.

The program executed by the POS terminal 1 of the embodiment is recorded in a computer-readable recording medium such as a CD-ROM, a flexible disk (FD), a CD-R, a DVD (Digital Versatile Disk), or the like, in an installable format or a file in an executable format.

Further, a program executed by the POS terminal 1 of the embodiment may be stored on a computer connected to a network such as the Internet and downloaded via the network. The program executed by the POS terminal 1 of the embodiment may be distributed over the network such as the Internet.

Furthermore, the program executed in the POS terminal 1 of the embodiment may stored in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A registration apparatus for registering commodity information, comprising:
   a bar code reader configured to read commodity information from a symbol attached to a commodity;
   a wireless tag reader configured to read tag information stored in a wireless tag attached to a commodity;
   a first cancel key, a second cancel key, and a third key; and
   a processor configured to:
      upon reading of tag information stored in a wireless tag via the wireless tag reader, acquire commodity information associated with the tag information and register the acquired commodity information as first data,
      upon reading of commodity information from a symbol via the bar code reader, register the read commodity information as second data,
      after commodity information have been registered as the first data for a first plurality of commodities and as the second data for a second plurality of commodities, upon detection of the first cancel key being operated, cancel registration of all the commodity information registered as the first data,
      upon detection of the second cancel key being operated, cancel registration of all the commodity information registered as the first and second data, and
      upon detection of the third key being operated, perform settlement processing based on the commodity information registered as the first and second data.

2. The registration apparatus according to claim 1, further comprising:
   an antenna connected to the wireless tag reader and arranged at a predetermined area, wherein
   the wireless tag reader is configured to read tag information stored in each of a plurality of wireless tags placed on the predetermined area at once.

3. The registration apparatus according to claim 2, wherein
   the processor is further configured to, upon reading of the tag information stored in said each of the plurality of wireless tags, acquire commodity information associated with each tag information and register the acquired commodity information as the first data.

4. The registration apparatus according to claim 1, further comprising:
   a speaker, wherein
   the processor is configured to control, upon registration of commodity information, the speaker to output a sound indicating that commodity information is registered.

5. The registration apparatus according to claim 1, further comprising:
   a first display, wherein
   the processor is configured to
      control, upon registration of commodity information as the first data, the first display to display information indicating the wireless tag reader, and
      control, upon registration of commodity information as the second data, the first display to display information indicating the bar code reader.

6. The registration apparatus according to claim 1, further comprising:
   a counter table in which an antenna of the wireless tag reader is embedded.

7. The registration apparatus according to claim 1, further comprising:
   a memory that stores a database that associates tag information for identifying a wireless tag with commodity information for identifying a commodity.

8. The registration apparatus according to claim 1, further comprising:
   a first display arranged at a first side where the first cancel key is arranged, and
   a second display arranged at a second side opposite to the first side.

9. A method for registering commodity information using a registration apparatus including a wireless tag reader, a bar code reader, a first cancel key, a second cancel key, and a third key, the method comprising:
   upon reading of tag information stored in a wireless tag via the wireless tag reader, acquiring commodity information associated with the tag information, and registering the acquired commodity information as first data;
   upon reading of commodity information from a symbol via the bar code reader, registering the read commodity information as second data;
   after commodity information have been registered as the first data for a first plurality of commodities and as the second data for a second plurality of commodities, upon detection of the first cancel key being operated, cancelling registration of all the commodity information registered as the first data;
   upon detection of the second cancel key being operated, cancelling registration of all the commodity information registered as the first and second data; and
   upon detection of the third key being operated, performing settlement processing based on the commodity information registered as the first and second data.

10. The method according to claim 9, further comprising:
    reading tag information stored in each of a plurality of wireless tags placed on a predetermined area where an antenna of the wireless tag reader is installed, at once.

11. The method according to claim 10, further comprising:
    after reading of the tag information stored in said each of a plurality of wireless tags, acquiring commodity information associated with each tag information and registering the acquired commodity information as the first data.

12. The method according to claim 9, further comprising:
    upon registration of commodity information, outputting from a speaker a sound indicating that commodity information is registered.

13. The method according to claim 9, further comprising:
    upon registration of commodity information as the first data, displaying information indicating the wireless tag reader, and
    upon registration of commodity information as the second data, displaying information indicating the bar code reader.

14. The method according to claim 9, further comprising:
    storing in a memory a database that associates tag information for identifying a wireless tag with commodity information for identifying a commodity.

15. The method according to claim 9, wherein
    the registration apparatus has a first display arranged at a first side where the first cancel key is arranged, and a second display arranged at a second side opposite to the first side.

16. A non-transitory computer readable medium storing a program causing a computer to execute a method of registering commodity information, the method comprising:
  upon reading of tag information stored in a wireless tag via a wireless tag reader, acquiring commodity information associated with the tag information, and registering the acquired commodity information as first data;
  upon reading of commodity information from a symbol via a bar code reader, registering the read commodity information as second data;
  after commodity information have been registered as the first data for a first plurality of commodities and as the second data for a second plurality of commodities, upon detection of a first cancel key being operated, cancelling registration of all the commodity information registered as the first data;
  upon detection of a second cancel key being operated, cancelling registration of all the commodity information registered as the first and second data; and
  upon detection of a third key being operated, performing settlement processing based on the commodity information registered as the first and second data.

17. The registration apparatus according to claim 1, further comprising:
  a fourth key for registering commodity information about a particular commodity, wherein
  the processor is further configured to, upon receipt of an input of the fourth key, register the commodity information about the particular commodity as second data.

18. The method according to claim 9, wherein
  the registration apparatus further includes a fourth key for registering commodity information about a particular commodity, and
  the method further comprises, upon receipt of an input of the fourth key, registering the commodity information about the particular commodity as second data.

19. The computer readable medium according to claim 16, wherein
  the method further comprises, upon receipt of an input of a fourth key for registering commodity information about a particular commodity, registering the commodity information as second data.

* * * * *